2,651,181

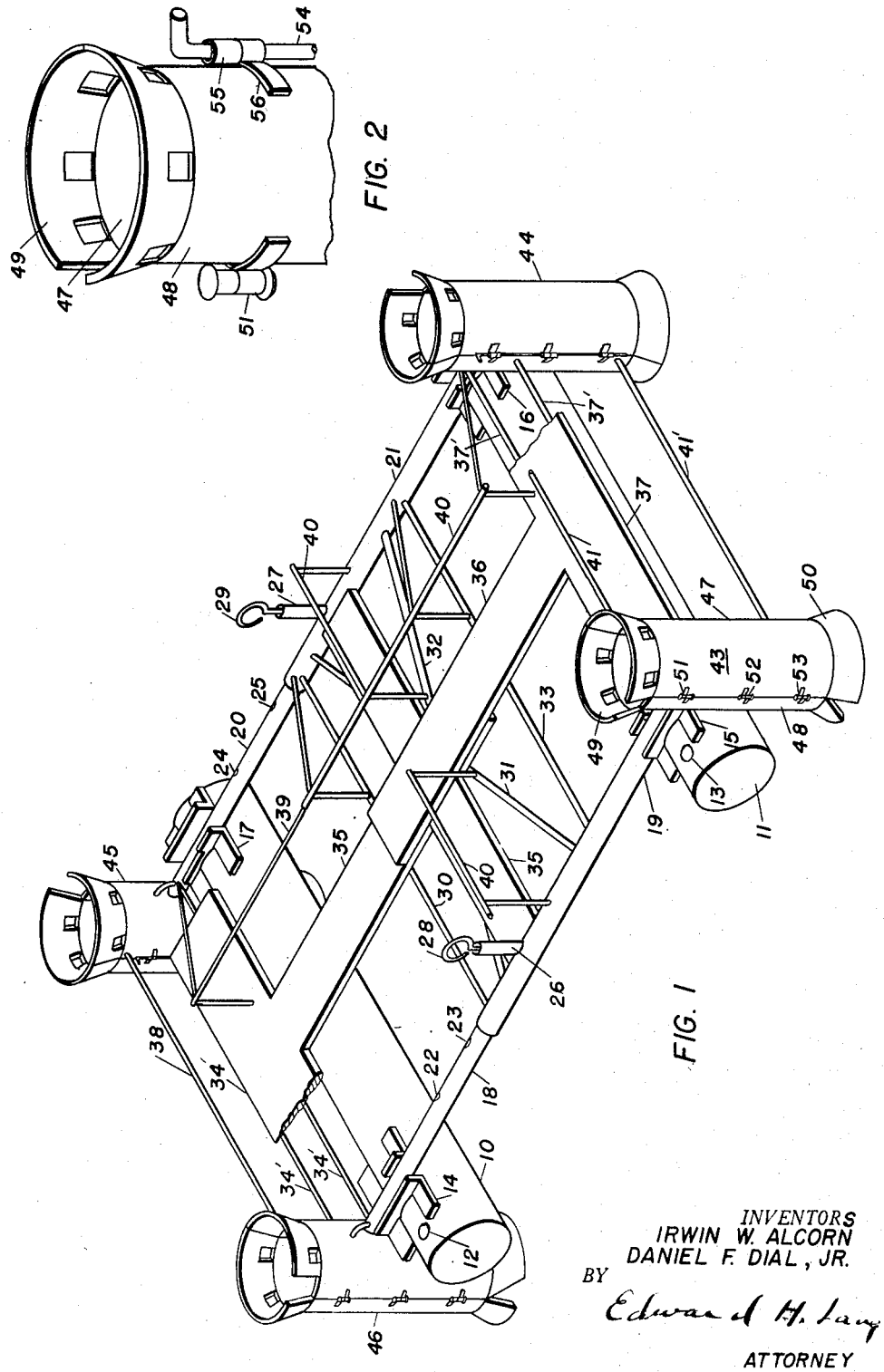
Sept. 8, 1953  I. W. ALCORN ET AL  2,651,181
FLOATING TELESCOPIC PILING TEMPLATE
Filed Aug. 20, 1948
INVENTORS
IRWIN W. ALCORN
DANIEL F. DIAL, JR.
BY
Edward H. Lang
ATTORNEY Patented Sept. 8, 1953

UNITED STATES PATENT OFFICE 2,651,181

FLOATING TELESCOPIC PILING TEMPLATE

Irwin W. Alcorn and Daniel F. Dial, Jr., Houston, Tex., assignors to The Pure Oil Company, Chicago, Ill., a corporation of Ohio Application August 20, 1948, Serial No. 45,405

8 Claims. (Cl. 61—63)

This invention relates to buoyant structural means for facilitating the construction of apparatus for underwater drilling operations.

Frequently drilling operations and, in particular, drilling for oil wells, are carried on under bodies of water which may be shallow lakes or relatively deep off-shore ocean water. Where the water is deep, considerable improvization must be adopted in order to make it possible to handle the drilling rigs to accomplish the purposes desired. Because the roughness and changes in level of water raise and lower floating platforms carrying drilling apparatus, it is desirable to have a stationary platform over the spot to be drilled so that drilling operations can be carried out conveniently. Accordingly, it becomes necessary to erect a platform on some kind of piling at points over water.

Thus, it is a fundamental object of the instant invention to provide a method of erecting a platform for drilling apparatus over a body of water so that the platform can be fabricated satisfactorily in spite of changes in water conditions.

It is a second object of the invention to provide a method and apparatus for constructing an over-water platform, which apparatus is economical in use and relatively easy to fabricate.

It is a further object of the invention to provide structural means which can be used repeatedly for assisting in erecting over-water platforms.

Other objects and advantages of the invention will in part be obvious and in part appear hereinafter.

The invention, accordingly, comprises a plurality of structural members in combination with buoyant members so that the entire structure can be floated on water and also includes guide members for spotting piles which are driven into the bed of the body of water, on which the apparatus is floated, and the apparatus is also adjustable in size so that after completion of a pile driving operation, it can be separated from the stationary piles and moved to a new location for re-use.

In accordance with this invention, a working platform for personnel is carried by buoyant members so that the entire structure can be floated on a body of water and the platform includes in combination therewith a plurality of guides for the driving of piling and further provides for collapsing or telescoping of the working platform to a reduced length so that it can be removed from among the piles.

In the drawing,

Figure 1 constitutes a line drawing showing an isometric view of the apparatus.

Figure 2 is a detailed showing of one of the guide members.

Referring now to the drawing for a more comprehensive description of the apparatus, 10 and 11 are buoyant members which normally take the form of pontoons for supporting the entire structure on a body of water. Provision in the form of inlets 12 and 13, normally kept closed, can be made for adding or pumping liquid ballast into the pontoons or removing liquid from the pontoons in order to adjust the buoyancy thereof. Fastened to the pontoons by means of plates 14, 15, 16 and 17, there are structural members 18, 19, 20 and 21, which are preferably of uniform cross section and arranged to telescope so that the length of the floating apparatus can be adjusted to suit the particular need. In the drawing, member 18 is shown telescoping with 19, and 20 telescoping with 21. Also shown in the figure are several holes 22, 23, 24 and 25 in members 18 and 20. They are spaced at convenient intervals and arranged so that they can be aligned with guides 26 and 27 joined to members 19 and 21, and carrying pins 28 and 29. To maintain members 18—19 and 20—21 in a fixed relationship with each other, pins 28 and 29 are placed to intercept both pairs of structural members through holes properly aligned with guides 26 and 27.

To hold structural members 19 and 21 in a proper fixed spaced relationship to provide a base for a working platform, support members 30, 31, 32 and 33 are used. In order that there may be working space on the platform, a catwalk comprising members 34, 35, 36 and 37 is provided. The catwalk may be made of planks or steel floor plates which are supported by the pontoons and cross braces 34' and 37'. Along the catwalk to provide support for working personnel is a handrail including sections 38, 39, 40 and 41. Cross brace 41' parallels handrail section 41 and serves to help maintain the pile guides in fixed position. Sections 39 and 40 of the handrail and 35 and 36 of the catwalk are made to telescope so that the handrail and walk are automatically adjusted in length when the structural support is telescoped or opened.

At each corner of the structure, there is provided a guiding member cylindrical in form so that a pile slipped into or through the guide can be set in place under the body of water. Thus, at the several corners of the apparatus there are guide members 43, 44, 45 and 46. These may be joined to the several structural members 18, 19, 20 and 21 at the points where they are fastened to the pontoons 10 and 11 by any conventional means, as for example, by welding.

Referring specifically to guide member 43, shown separately in Figure 2, which represents a typical embodiment of this portion of the structure, it will be seen that it consists of two semi-cylindrical elements 47, 48, which are matched to define a complete cylinder of diameter large enough to encircle a pile. The guide member is flared at its top and bottom 49 and 50 to simplify the task of inserting a long pile thereinto. The two semi-cylindrical members can be hung together along one of the longitudinal joints by hinges 51, 52 and 53, and locking bar 54 can be provided to hold the other edges together by means of eyes 55 and 56.

In a drilling operation, when a spot for drilling has been selected, it is necessary to erect a stationary platform and one of the simpler ways of so doing is to drive a series of piles and erect a structure thereon. When conventional apparatus is used, a fixed template is employed to set the piles at their proper spacing and must remain in place with the piles. When the instant apparatus is used, the desired spacing of the piles is obtained by adjusting the amount of telescoping of the structural members 18, 19, 20 and 21 and setting four piles in place by driving them through the respective guides 43, 44, 45 and 46. When the piles have been set in place, the template can be removed and re-used very simply by lifting pins 28 and 29, thereby unlocking the apparatus, unlocking guides 43—46 by removing bar 54 and those corresponding thereto on all four guides, and then telescoping the template sufficiently to permit its removal from its location between the piles. If desired, the means for moving the members apart or together can be power driven.

By using the apparatus, a large number of piles can be driven and spaced at desired intervals with the use of only a single template. The advantage of using this method and apparatus over the conventional practice which involves the use of a template of fixed size is apparent, for the amount of equipment which must be carried to the drilling site is reduced and the number of piles which can be brought to the site is increased. Thus, the operating and economical advantages of our invention are apparent.

In off-shore or under-water drilling, the use of a template of some kind is desirable in order to make possible accurate spacing of piles. Though normally the spacing of piles in building wharves may be considered of somewhat secondary importance, when the operation is being performed in water away from shore, it takes on considerable added significance, because accurate spacing becomes extremely difficult, if not impossible, when the piles are being driven from a floating barge or ship in open water. A second substantial advantage derived from the accurate spacing of piles is that considerable prefabrication of the structure to be erected thereon can be accomplished on shore, thereby simplifying operations which must be carried out over water.

The pile guides described in connection with the embodiment of the structure detailed in the instant specification would naturally be of a fixed size large enough to accommodate the largest pile to be driven. Where substantially smaller diameter piles are to be used, an adapter in the form of a collar around a pile large enough to center it in the guide can be used.

Although in this description, only a single embodiment of the invention has been set forth, it is not to be considered restrictive, but rather as illustrative thereof.

What is claimed is:

1. An apparatus for the erection of a structure of driven piles in the bed below a body of water, comprising a plurality of structural members to support a working platform, buoyant means attached to said members for floating said platform on water, pile guiding means attached to several longitudinal members of said working platform, said longitudinal members being adjustable in length, each of said pile guiding means comprising laterally releasable columnar units, the length adjustment of said longitudinal members and the releasability of said pile guiding means cooperating to permit the removal of said apparatus from the driven piles.

2. The apparatus in accordance with claim 1 having at least two pile guiding means mounted on one of said adjustable longitudinal members.

3. An apparatus in accordance with claim 1 in which the pile guide means are cylindrical in form and held in spaced relationship to guide piles substantially vertically into desired position.

4. An apparatus for the erection of a structure over water comprising a plurality of structural members to support and define a working platform, buoyant means for floating said members on water, pile guiding means held in adjustable space relationship to each other by said structural members, said pile guiding means comprising semi-cylindrical units matched to define cylinders, said units being held to each other by at least one hinged joint, said hinged joint opening and closing laterally, and means for adjusting the spaced relationship of certain of said guide means to each other including at least two parallel structural members formed to telescope and arranged to be fixed in any one of a plurality of positions establishing different lengths for the support for said working platform.

5. The apparatus in accordance with claim 4 in which the telescoping members define substantially the outer extremities of a rectangular platform support and are tubular in form.

6. The apparatus in accordance with claim 4 in which the telescoping members define the outer framework of the platform support and are integrally joined to the buoyant means for floating the apparatus on water and to the pile guides.

7. The apparatus in accordance with claim 4 in which the pile guides are maintained at the extremities of said telescoping members.

8. The apparatus in accordance with claim 4 in which the pile guiding means comprises a plurality of hinge units arranged to open laterally.

IRWIN W. ALCORN.
DANIEL F. DIAL, Jr.

References Cited in the file of this patent

UNITED STATES PATENTS

| Number | Name | Date |
| --- | --- | --- |
| 342,096 | Holley | May 18, 1886 |
| 496,729 | Fairchild | May 2, 1893 |
| 567,060 | Work | Sept. 1, 1896 |
| 1,966,974 | Vermont | July 17, 1934 |